United States Patent [19]

Evans

[11] 3,962,704

[45] June 8, 1976

[54] MOVING TARGET INDICATOR CLUTTER TRACKER

[75] Inventor: Norol T. Evans, San Pedro, Calif.

[73] Assignee: Hughes Aircraft Company, Culver City, Calif.

[22] Filed: May 31, 1974

[21] Appl. No.: 475,217

[52] U.S. Cl. ............................................. 343/7.7
[51] Int. Cl.² ........................................ G01S 9/42
[58] Field of Search ................................... 343/7.7

[56] References Cited
UNITED STATES PATENTS

| | | | |
|---|---|---|---|
| 3,042,915 | 7/1962 | Nordell | 343/7.7 |
| 3,706,989 | 12/1972 | Taylor, Jr. | 343/7.7 X |
| 3,755,813 | 8/1973 | Evans et al. | 343/7.7 |

Primary Examiner—Malcolm F. Hubler
Attorney, Agent, or Firm—Walter J. Adam; W. H. MacAllister

[57] ABSTRACT

An improved MTI (Moving Target Indicator) cancelling system that provides cancellation in the first canceller stage of clutter at a first frequency and cancellation in a second or subsequent canceller stage of clutter such as weather or chaff with a substantial doppler frequency offset from that cancelled in the first MTI canceller. The first canceller stage may be a conventional in-phase (I) and in-quadrature (Q) digital MTI unit to develop the I and Q first differences followed by a conversion of these differences into a combined first difference designated as a quantity M and representing an angle times an amplitude multiplier. This M signal is then applied to a second canceller to develop a second difference signal which is then normalized to represent a pure angle term. A computer then determines the average angular error percentage over a selected number of adjacent range bins at each range bin interval and this percent error is then multiplied by the time aligned value of M to provide an actual error and a modified value of M is developed by subtracting the actual error from the value of M. The modified first difference signal is then subtracted from the delayed first difference signal to generate a second difference output signal with the undesired clutter at different doppler frequencies being cancelled.

7 Claims, 9 Drawing Figures

Fig. 7.
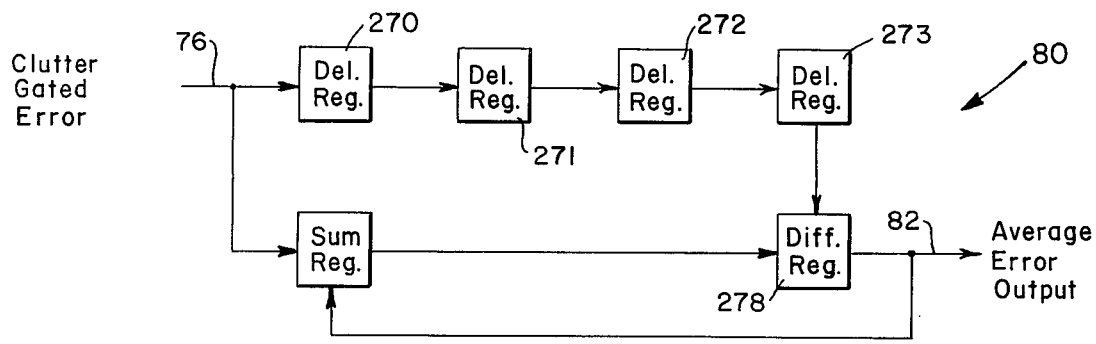
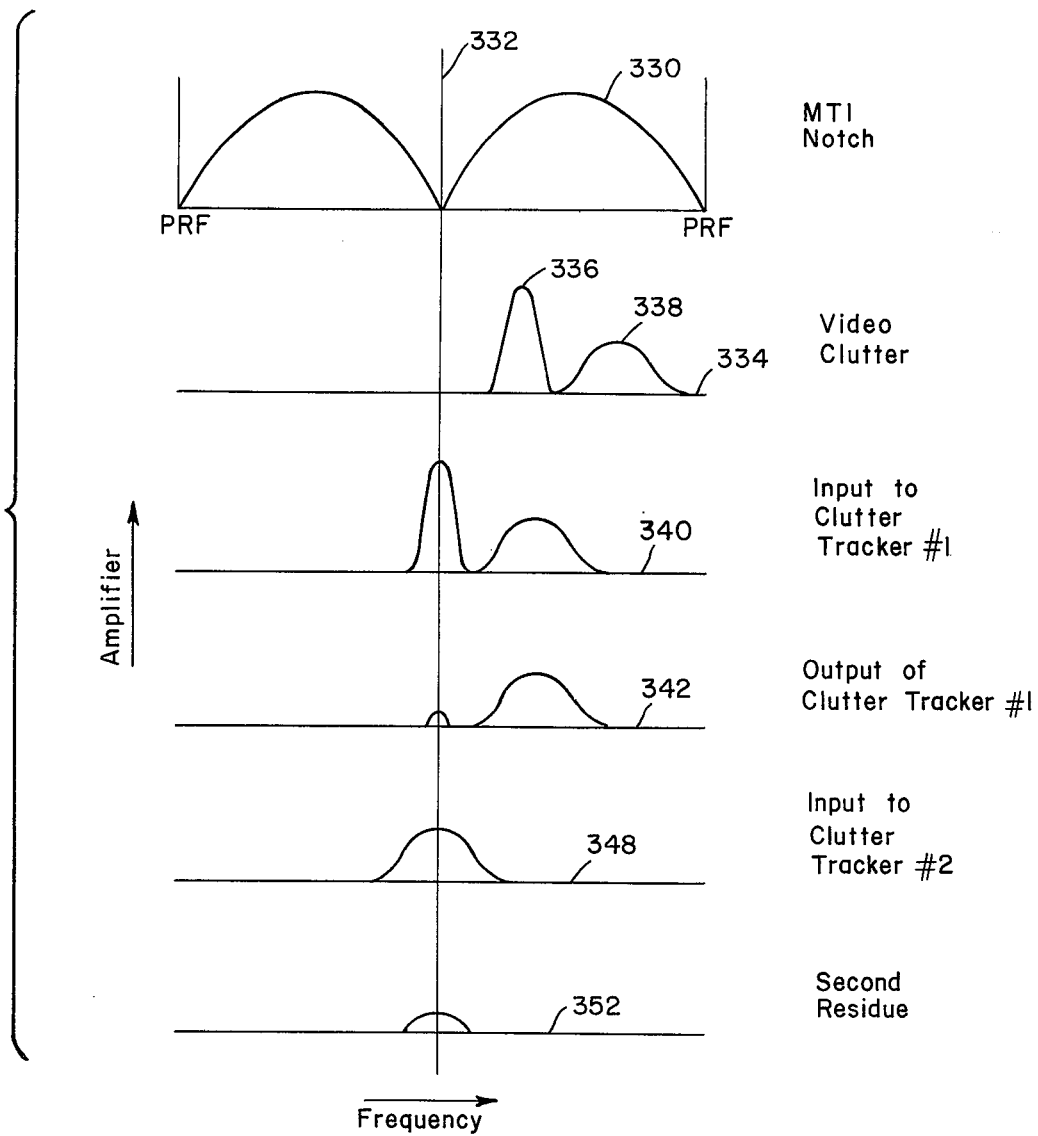
Fig. 9.

MOVING TARGET INDICATOR CLUTTER TRACKER

BACKGROUND OF THE INVENTION

1. Field of the Invention

This invention relates to radar systems and particularly to an improved moving target indicator and clutter tracking system in which clutter offset at different doppler frequencies is cancelled in different moving target indicator stages.

2. Description of the Prior Art

In a moving target indicator (MTI) system, a coherent oscillator is provided and is locked in frequency to the ground clutter or is tracking the ground clutter in the first canceller stage so that other types of clutter such as weather or chaff at a different doppler frequency offset are not sufficiently cancelled either in that or in subsequent stages. Complex cancellers using feed forward and feedback techniques have been developed for clutter cancellation to give shaped filter characteristics such as butterworth or chebyshev responses. When these arrangements are utilized in clutter environments in which two different doppler frequencies are encountered, an attempt is made to widen the MTI notch so that both clutter responses will be contained in the notch. However, these complex shaped filters have only a limited range of adjustment so that in many situations a required doppler offset between two types of clutter will exceed the adjustment range resulting in the clutter being improperly cancelled. Another type of clutter canceller utilizes a clutter tracker which for example may vary the frequency of the coherent oscillator in response to the cluter doppler frequency. It has been found that when the different velocity clutters overlap in range, the clutter tracker will track the power mean of the two clutter returns thus giving a relatively poor performance on the smaller clutter return. It would be a substantial advantage to the radar art if a clutter tracking system was provided that allows second or subsequent stages of the MTI canceller to independently track clutter energy at different doppler offset frequencies.

SUMMARY OF THE INVENTION

The improved clutter tracker of the invention allows the first canceller stage in the MTI system to either be transmitter locked to the ground clutter or tracking the first frequency clutter or ground clutter while the second subsequent canceller stage is controlled in a simplified and improved manner so that the MTI notch in that stage is effectively offset in doppler frequency to cancel other clutter at a second frequency such as weather or chaff. In the first canceller stage the IF input signal is phase detected in the in-phase and quadrature phase detectors, A/D (Analog to Digital) converted and then processed to determine I and Q first differences. A quadratic computer then converts the inphase and quadrature first differences into a quantity M that is linear over 360° and represents an angle times an amplitude multiplier. A 1/PRF delay unit and subtracter provides a second difference signal in response to the value M which is then normalized to represent a pure angle term. A clutter gate is controlled to gate the angle term into an error averaging computer if the signal in that range bin is the result of a clutter residue. This computer effectively determines the average angular error over each of a selected number of adjacent range bins so as to correct for each range bin, the present value of the angle as a function of the past value of the angles. This average error which is a percent of error is then multiplied by the time aligned value of M or first difference to determine the actual error which is then subtracted from the time aligned value of M to provide an adjusted value of M corrected inphase for substantially complete cancellation. The corrected first difference signal is then subtracted from the 1/PRF delayed first difference signal to generate the second difference output signal with the offset weather or chaff clutter substantially cancelled.

It is therefore an object of this invention to provide an improved moving target indicator (MTI) system that effectively cancels clutter at different doppler offset frequency values.

It is a further object of this invention to provide a clutter tracking system that provides clutter tracking in a second canceller stage.

It is another object of this invention to provide an MTI clutter tracking system in which the first canceller stage may be transmitter locked or tracking ground clutter and a second canceller stage tracks and cancels weather or chaff clutter.

It is a still further object of this invention to provide an improved MTI clutter tracking system that with a simplified and reliable control arrangement provides cancelling in canceller stages beyond the first stage by effectively shifting the clutter frequency to the MTI notch.

BRIEF DESCRIPTION OF THE DRAWINGS

These and other objects, features and advantages of the invention itself, will become apparent to those skilled in the art in the light of the following detailed description taken in consideration with accompanying drawings wherein like reference numerals indicate like corresponding parts throughout the several parts wherein:

FIG. 7 is a schematic block diagram of the error averaging computer of FIG. 1.

FIG. 9 is a schematic diagram of waveforms of amplitude as a function of frequency for further explaining the operation of the clutter tracker of FIG. 1.

DESCRIPTION OF THE PREFERRED EMBODIMENT

Figure 1:
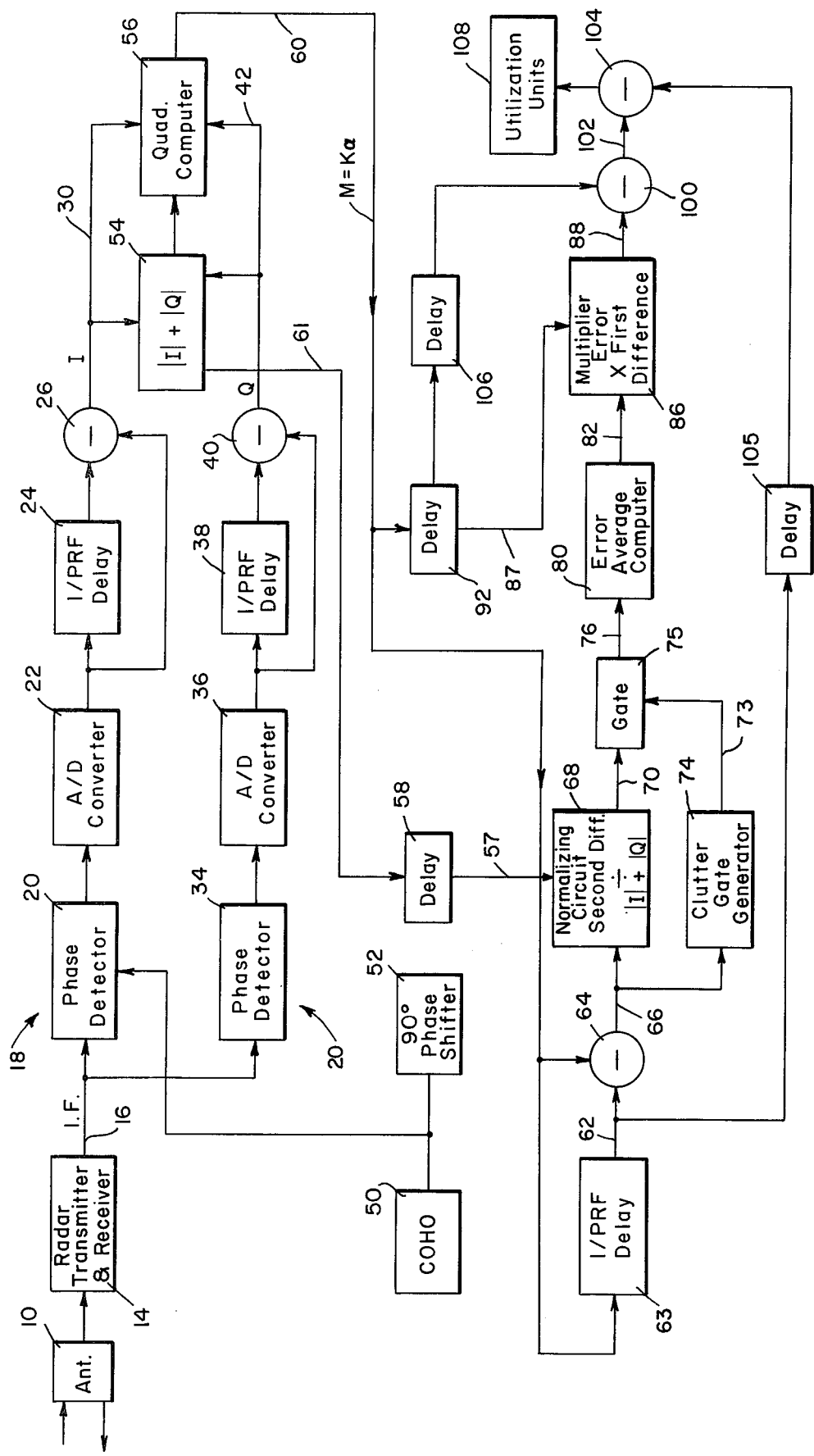
FIG. 1 is a schematic block diagram showing the offset doppler frequency MTI clutter tracker in accordance with the invention.

Referring first to FIG. 1 the moving target indicator (MTI) system and offset doppler frequency clutter tracker in accordance with the invention includes an antenna 10 coupled to a radar transmitter and receiver unit 14 which may be any conventional pulse doppler transmitter and receiver unit transmitting energy into space or toward a surface such as the ground or water and receiving energy not only from a target but also receiving ground or land clutter energy and other clutter energy such as weather clutter or chaff clutter. The clutter received may have a doppler opposite frequency between the land clutter and the weather clutter for example. The receiver unit as is well known in the art, may include a conventional coherent mixer for providing an IF (Intermediate Frequency) signal which is applied on a lead 16 to an in-phase (I) channel 18 and a quadrature (Q) channel 20 that forms the first canceller stage of the MTI system in accordance with the invention. The I channel 18 includes a phase detector 20, an A/D (Analog to Digital) converter 22, a 1/PRF delay unit 24, and a subtractor unit 26 receiving signals during each range bin from the present range bin being provided by the A/D converter 22 and the signal of the same range bin delayed 1 range sweep period in the delay unit 24. The subtractor 26 develops the first difference in-phase or I signal on a lead 30. The Q channel 20 includes a phase detector 34, an A/D (Analog to Digital) converter 36, a 1/PRF delay unit 38, and a subtractor unit 40 receiving timely range bin data from the output of the A/D converters 36, as well as data from the corresponding range bin of the previous sweep from the delay unit 38, to provide a Q difference signal on a lead 42. The coherent oscillator (coho) 50 develops a reference signal for the phase detector 20 and applies a signal through a 90° phase shifter 52 for developing a quadrature reference signal for the phase detector 34. To combine the I and Q signals into an amplitude signal $|I| + |KQ|$ or $|K| + |IQ|$ indicated for convenience as $|I| + |Q|$, a combining circuit 54 is coupled to the I and Q leads 30 and 42 to develop a combined signal representing amplitude of the resultant which is applied to a delay unit 58.

The next operation is to convert the in-phase and quadrature first difference signals into a quantity that corresponds to an angular difference signal which is ambiguous only at 360°. A quadrature computer 56 is coupled to the leads 30 and 42 for developing a signal M which represents an angle $\alpha$ times an amplitude multiplier $K(M=K\alpha)$. The signal M represents the resultant first difference signal, as is well known in the art.

The output signal from the quadratic computer 56 is applied on lead to a 1/PRF delay unit 63 which may be of a conventional shift register type, to apply the range bin data delayed 1 radar sweep period through a lead 62 to a subtracter 64. The lead 60 is also coupled to the subtracter 64 to apply the present value of M in each range bin thereto to develop a second difference signal on a lead 66 which is then normalized by being applied to a normalizing circuit 68 also receiving the resultant amplitude signal $|I| + |Q|$ through a lead 57 from the delay unit 58. A pure phase signal or normalized signal which is bipolar, is applied to a lead 70 and represents an angular error of the clutter at the offset frequency because the amplitude term has been divided out of the second difference term. If this angle term is the result of the clutter residue, the clutter gate generator 74 gates the angular term on the lead 70 through a gate 75 to a lead 76, the clutter gate generator 74 requiring m out of n successive range bins exceeding a preset threshold in order to generate a clutter gate signal which is applied through a lead 73 to the gate 75. The clutter gate generator 74 thus controls the gate 75 to only pass the phase angle signal therethrough when there is a determination that clutter is present. The normalized second difference signal is applied from the lead 76 into an error averaging computer 80 which during each range bin interval determines the average angular error over each four adjacent range bins. The process of normalizing the second difference signal and averaging over four range bins prevents a large target in one range bin from capturing the clutter tracker so as to cause the target to be cancelled.

The signal provided by the error average computer 80 is applied to a lead 82 and represents a percent error of the phase angle derived from the amplitude of the first difference signal. The average error or percentage of error on the lead 82 is then multiplied by the time aligned value of M from a delay unit 92 and a lead 87, which has a value representative of the amplitude times the angle of the signal in the range bin, in a multiplier 86 to develop an actual error signal on a lead 88. As the signal on the lead 88 represents the computed error or computed actual error this signal is then subtracted in a subtracter 100 from the time aligned value of M or first difference signal to develop on a lead 102, a modified present value of M signal which is the adjusted value of M effectively shifted so that the weather or chaff clutter will cancel. The corrected first difference signal on a lead 102 is then subtracted from the 1/PRF delayed signal after passing from the lead 62 through a delay unit 105, to generate a second difference output signal with substantially total cancellation of the offset weather clutter. The second difference output signal is applied from the subtracter 104 to a utilization unit 108 which for example may be a computer or a display unit. The delay unit 58 has sufficient delay to account for the delays through the subtracter 64 and the quadratic computer 56, the delay unit 92 has sufficient delay to be equal to the delay through the subtracter 64, the dividing circuit 68, the gate 75 and the error average computer 80, the delay unit 106 has a delay equal to the delay through the multiplier 86 and the subtracter 100 and the delay unit 105 has delay equal to the delay through the signal path between the input of subtracter 64 and the output of the subtracter 100.

Figure 2:
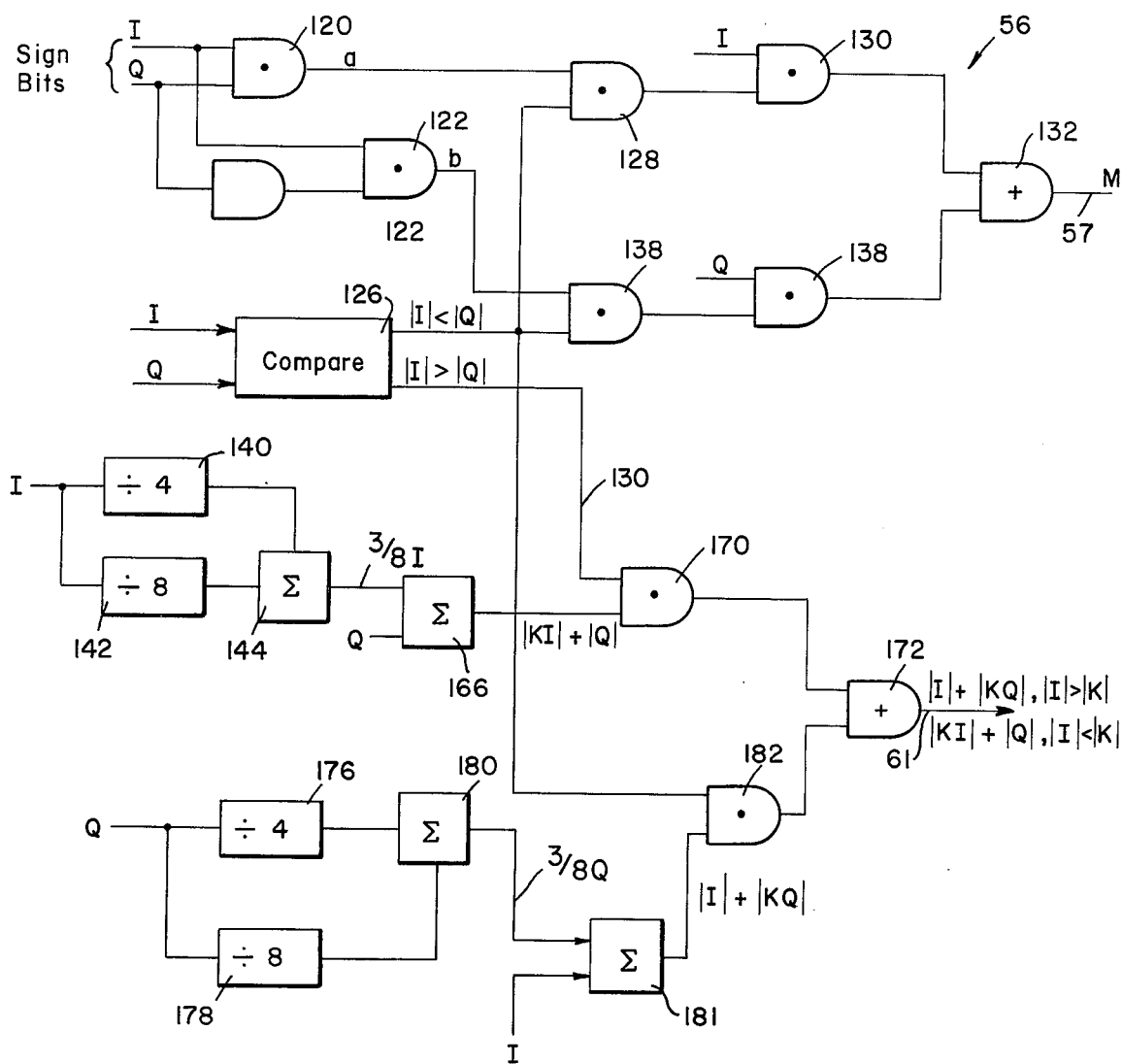
FIG. 2 is a schematic block and circuit diagram of the in-phase and quadrature combining unit and the quadrature computer of FIG. 1.
Figure 3:
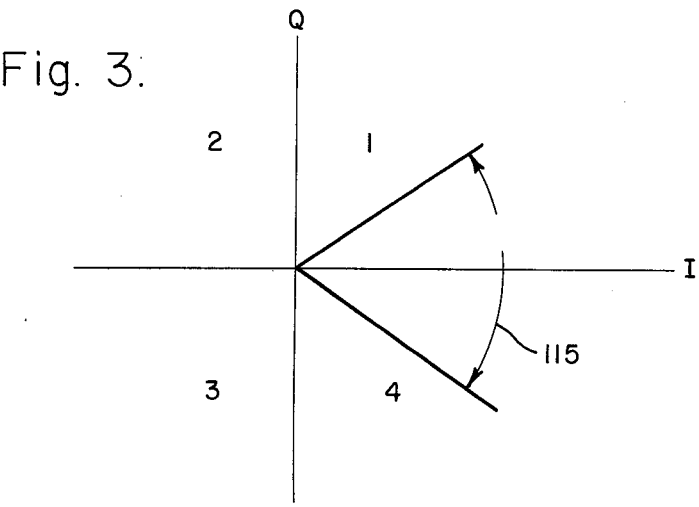
FIG. 3 is a schematic diagram showing the four quadrants of the video signal and the operating range of the quadrant computer of the invention.
Figure 4:
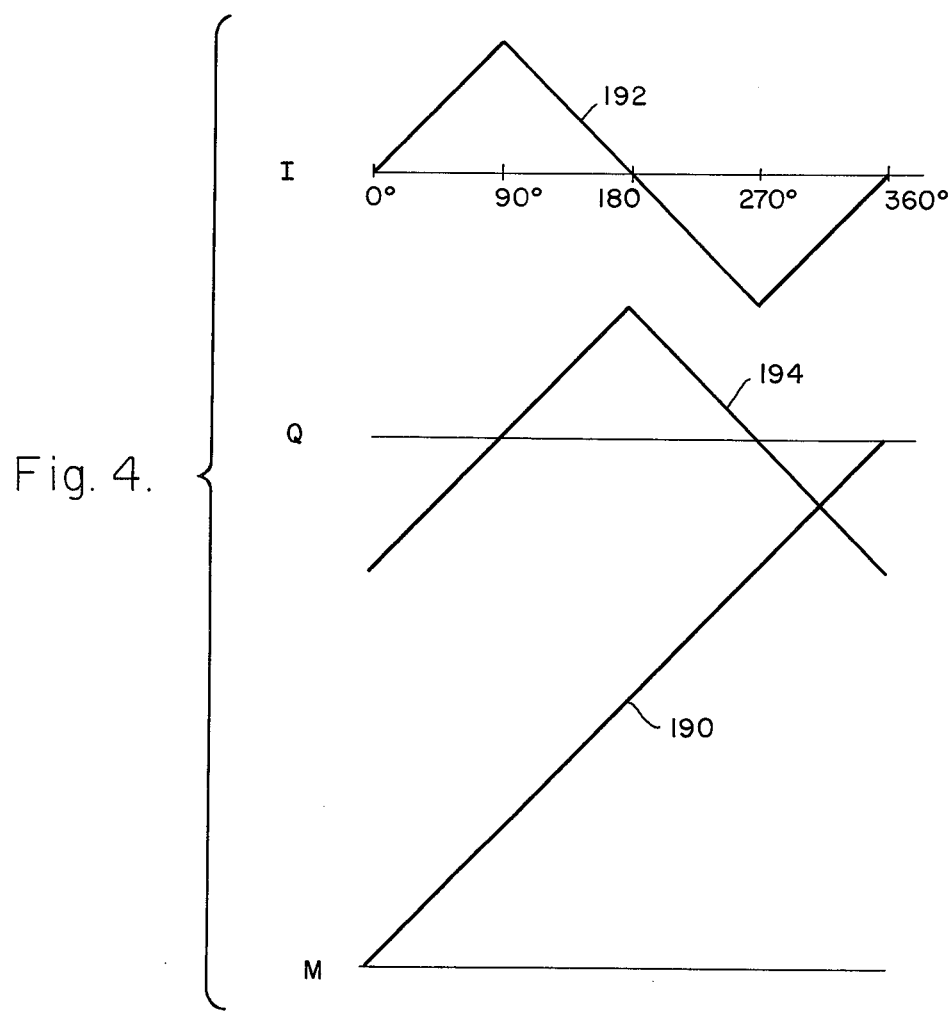
FIG. 4 is a schematic diagram of phase angle as a function of amplitudes for further explained operation of the quadrant computer.

Referring now to FIGS. 2, 3 and 4 the signal combiner 54 and the quadratic computer 56 will be explained in further detail. As shown by the I and Q diagram of FIG. 3, operation in half of each of the first and fourth quadrants may be provided with over a 90° angular range of phase shift of the signal M, which was found to be suitable for most operations. It is to be noted that if PRF is increased a greater offset frequency is allowed for any fixed number of degrees. Operation over all of quadrant 1 by the signal M occurs under the following condition:

$$M = Q, Q < 1$$

$$M = KI + Q - 1, Q > 1$$

operation over all of quadrant 4 occurs under the following condition:

$$M = Q, |Q| < 1$$

$$M = -(KI + |Q|) + 1, Q > 1$$

Because, M = Q for both conditions $Q < I$, and $|Q| < I$ over the −45° to +45° indicated by the angle 115, the simplified mechanization of FIG. 2 may be utilized. The I and Q sign bits may be applied to an AND gate 120 to provide a signal a for quadrant i and a signal I and an inverted form of the signal Q may be applied to an AND gate 122 to provide a signal b for the IQ condition of quadrant 4. A compare unit 126 responds to the I and Q signals to apply an $I > Q$ signal to an AND gate 128 and an $I < Q$ signal to an output lead 130. The AND gate 128 in the presence of an a signal and an $I > Q$ signal applies a signal to an AND gate 130 which passes the Q signal to an OR gate 132 and an M signal to the output lead 57. An AND gate 136 in the presence of a b signal and when $I < Q$, applies the Q signal to an AND gate 138 which passes the Q signal through the OR gate 132 as the M signal. For operation over other quadrants or for operation over the additional 45° of each of the first and fourth quadrants, suitable mechanizations as well known in the art may be utilized. For the combining unit 54, the I signal or in-phase signal is applied through divide units 140 and 142 to a summing unit 144 to apply a ⅜ I signal to a summing unit 166. A Q or quadrature signal is also applied to the sum unit 166 which develops a signal $|KI| + |Q|$ which is applied through an AND gate 170 when I is less than Q to apply a signal of $|I| + |Q|$ through an OR gate 172 to the lead 61. The signal on the lead 61 is $|I| + |KQ|$ or $|KI| + |Q|$ as previously discussed. Dividing circuits 176 and 178 respond to the Q signal to apply signals to a summer 180 which generates the signal 3/8 Q which along with I is applied to a summer 181. An AND gate 182 receives the signal I + KQ to pass the signals through the OR gate 172 when I is greater than Q. For other mechanization in accordance with the invention the complete solution $\sqrt{I^2 + Q^2}$ may be developed.

As can be seen in FIG. 4, quadratic computer 56 generates the linear signal M as shown by a waveform 190 by properly combining I and Q signals of respective waveforms 192 and 194 for the four quadrants if a large operating range of doppler frequency is required. However for the illustrated mechanization only 45° of each of the quadrants 1 and 4 are required to provide the value of M.

Figure 5:
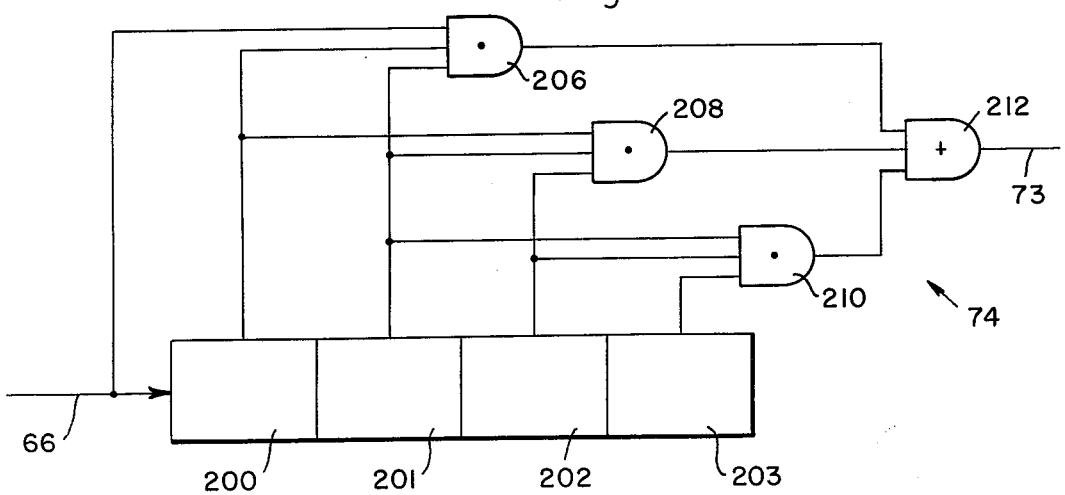
FIG. 5 is a schematic block and circuit diagram of the clutter gate generator of FIG. 1.

Referring now to FIG. 5 the clutter gate generator 74 for generating an N out of N signal representing N clutter conditions in N adjacent range bins, may be utilized although it is understood that any number of range bins having clutter of a selected number of total range bins may be utilized as a criteria if desired. The signal including clutter of each range bin is stored sequentially in storage or flip-flop units 200, 201, 202, and 203 the unit or flip-flop 200 storing the signal received from the second difference subtraction on the lead 66. AND gates 206, 208 and 210 are provided with the AND gate 206 responding to the input signal on the lead 66 and the signals stored in the flip-flops 200 and 201, with the AND gate 208 responding to the signals stored in the flip-flops 200, 201 and 202 and with the AND gate 210 responding to the signals stored in the flip-flops 201, 202 and 203. Any of the three conditions applies the signals through an OR gate 212 to the lead 73 indicating the presence of clutter and passing the angle signal through the gate 75.

Figure 6:
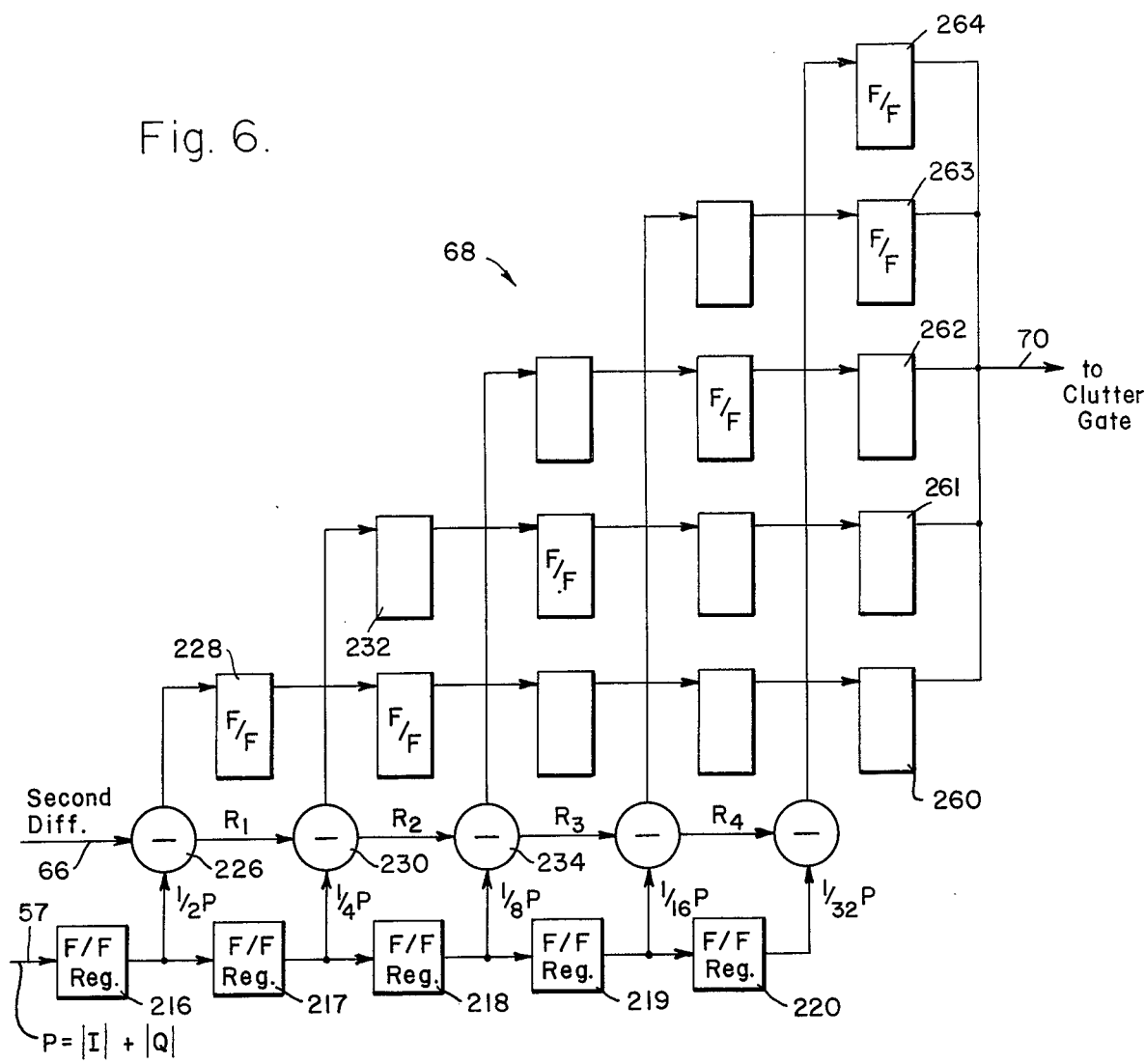
FIG. 6 is a schematic block diagram of the second difference normalizing unit of FIG. 1.

Referring now to FIG. 6 which shows further detail of computer 68 for normalizing the second difference or computing the second difference signal divided by $|I|$ + $|Q|$, with P indicating $|I| + |Q|$ on the lead 57 for convenience of illustration. A series of flip-flop registers 216 to 220 is provided to develop respective signals ½ P, ¼ P, ⅛ P, 1/16 P and 1/32 P. In operation, ½ P is compared to the second difference in a subtracter 226 and if the second difference is larger, ½ P is subtracted from it and a 1 is set in a first flip-flop 228 with the remainder $R_1$ being sent to the next stage at a subtracter 230. If ½ P is larger than the second difference as determined by a comparison, a 0 is set into the first flip-flop 228, ½ P is not subtracted from the first difference and the second difference signal is applied as $R_1$ is to the next stage of subtracter 230. In the next step, $R_1$ is compared to ¼ P in the subtracter 230 and the step 1 process is repeated placing a 1 in a flip-flop 232 and transmitting the remainder $R_2$ to a subtracter 234 or setting a 0 into the flip-flop 232 transmitting the value $R_1$ to the subtracter 234. This process continues until $R_4$ is compared to P/32. During each shift, values in the flip-flop such as 228 and 232 are transferred to the right so that during the final computation a value is in each of the output flip-flops 260 to 264 with a quotient then being applied to the output lead 70. It is to be noted that the illustrated example shows a system with 5-bit accuracy but that this can be extended in either direction by adding more or using less stages. If the system of the invention utilizes sine and cosine phase detector responses at this point of the system, the appropriate ⅜ $|I| + |Q|$ or $|I| + ⅜ |Q|$ may be utilized in the dividing unit. The registers 216 to 220 each of which operates in parallel may in some arrangements have a decreasing number of flip-flops from register 216 to register 220.

Referring to the error average computer 80 of FIG. 7 the clutter gated error signal which is a pure phase angular error of the clutter is applied from the lead 76 to a number of sequential delay registers 270 to 273 having a width of storage flip-flops equal to the number of bits of the digital signal. The error signal is also applied to a sum register 276, the output of which is applied to a difference register 278, also receiving the delayed data from the delay register 273 to apply a difference signal or average error output signal to the lead 82. The sum register 276 receives the difference signal from the lead 282 to provide summation of the input signal and the four delayed input signals with the difference register 278 providing a subtraction of the input signal for previous range bins. Thus the error signal goes into a pure delay channel and into the summation register 276 where it is added to the present residue. After summation the input being four range bins delayed, is subtracted from the residue and the output is fed to error times first difference multiplier 86 on the lead 82 as well as back into the input summation register 276. Two least significant digits are discarded at the lead 82 to accomplish division by 4 which is the error signal applied to the multiplication circuit 86. The example is shown below:

| INPUT | DATA | OUTPUT |
|---|---|---|
| Range Bin 1 | A | 0 |
| Range Bin 2 | B | 0 |
| Range Bin 3 | C | A |
| Range Bin 4 | D | A+B |
| Range Bin 5 | E | A+B+C |
| Range Bin 6 | F | A+B+C+D |
| Range Bin 7 | G | A+B+C+D+E+−A |

Figure 8:
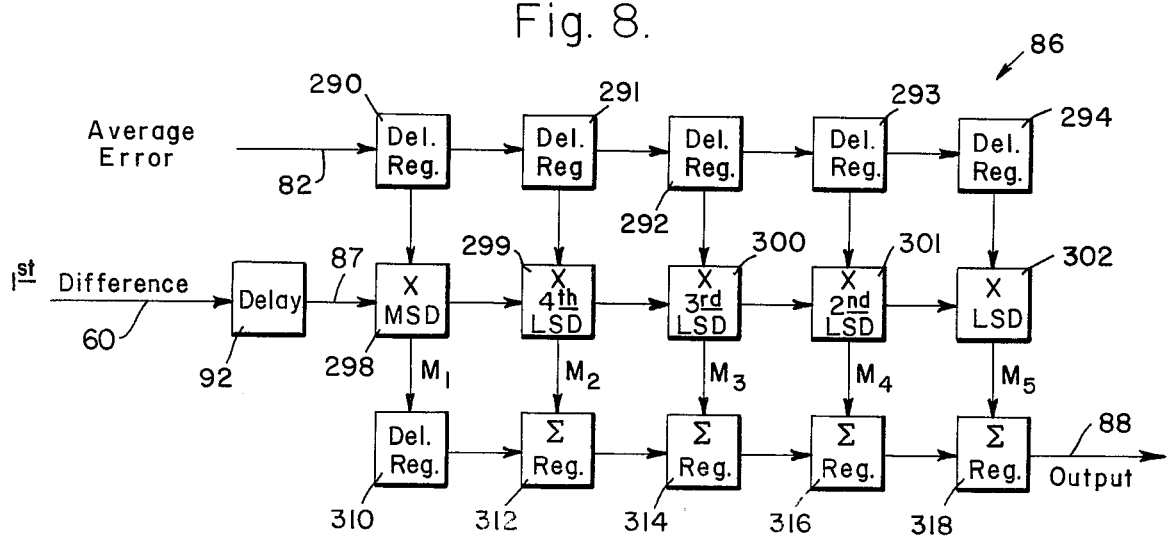
FIG. 8 is a schematic block diagram of the error times the first difference computer or multiplier of FIG. 1.

Referring now to FIG. 8 which shows an illustrative example of the error times first difference multiplier 86, the undelayed first difference signal or M signal on the lead 60 is delayed in the delay unit 92 to provide a time aligned signal M on the lead 87, time aligned to the average error signal in the one bit input delay registers 290 to 294 which serially receive (most significant digit to least significant digit) the average error signal on the lead 82. The first difference signal M is progressively multiplied bit by bit in multipliers 298 to 302 by the average error signal commencing with the most significant bit of the average error signal. If the most significant bit is a 1, the entire first difference is sent into a delay register 310 and at the next clock interval this value $M_1$ is sent to the summation register 312 where it is added to $M_2$. As provided by the multiplier 299, $M_2$ is either $M_1$ divided by 2 or 0 depending on the value of the fourth least significant bit of the error signal shifted into the delay register 291. This process continues until the final product is determined and values are shifted into summation registers 314, 316, and 318. Once the registers are loaded, the actual error signal appears in parallel on the composite output lead 88 during each subsequent range bin.

Referring now principally to FIG. 9 a waveform 330 shows the moving target indicator notch repeating at each PRF (Pulse Repetition Frequency) interval with the cancellation being principally provided at the 0 frequency point 332. Video clutter is shown by waveform 334 including a land clutter signal 336 which may be at a first doppler frequency and another clutter signal 338 which may be a weather or chaff signal. It is to be understood that the two clutters are not limited to any particular type but other types within the scope of the invention such as sea clutter for the clutter signal 336. Because of the operation of the coherent oscillator the input to the first clutter tracker and canceller stage is shifted to the position of a waveform 340 with the main signal or the land signal being centered at the MTI notch to be cancelled at the output thereof as shown by a waveform 342 having a residue signal 346 resulting from the cancelled land clutter signal. In the system of the invention by amplitude sensing and subtracting, the input to the second clutter tracker and canceller stage is effectively shifted to the position of the MTI notch as shown by a waveform 348 and the second difference output from the subtracter 104 has only a relatively small clutter residue 350 as shown by waveform 352. Thus the system operates reliably when the first canceller is transmitter locked to the ground clutter or is tracking the ground clutter and the offset clutter is independently cancelled in the second or subsequent canceller stage. A substantial advantage of the system of the invention is that it can be added to an existing MTI system that employs either transmitter lock on the first canceller, a controlled coherent oscillator for the MTI system or a clutter tracker of the type involving various feedbacks to the coherent oscillator for distinguishing clutters at different frequencies at different times.

Thus, there has been provided an improved offset doppler frequency MTI clutter tracking system in which the first canceller may be a conventional arrangement and the second canceller operates to correct the present value of the first difference signal by effectively shifting its phase so that the difference of two values the present and the past value of the first difference signal is substantially 0. The angular error is provided by the first difference of the previous sweep is utilized as a basis for correcting a second difference, which angular error is corrected over several range bins to eliminate the effect of any targets. This system provides an economical and improved method of performing the various computations on a range bin by range bin basis with low speed and relatively inexpensive hardware. It is to be understood that the illustrated mechanization is just one of many that may be utilized in accordance with the principles of the invention and other types of units may be utilized such as LSI and MSI multipliers and dividers for example.

What is claimed is:

1. A moving target indicator cancelling system responding to a radar signal having moving target components separated in frequency comprising
   first canceller means for developing a first difference signal,
   second canceller means for developing a second difference signal,
   normalizing means responsive to the amplitude of said first difference signal and to said second difference signal for developing an angular error signal,
   means responsive to said angular error signal and to said first difference signal for developing a corrected first difference signal, and
   subtracter means responsive to said corrected first difference signal and to said second difference signal for developing a corrected second difference signal.

2. The combination of claim 1 in which said first canceller means has an in-phase and a quadrature channel respectively passing in-phase and quadrature signals and further including means for developing an amplitude signal to be applied to said normalizing means, and including quadrature computer means coupled to said in-phase and quadrature channels to develop said first difference signal as a resultant of said in-phase and quadrature signals.

3. The combination of claim 2 in which said moving target indicator system defines a plurality of range bins and said means responsive to said angular error signal includes an error averaging computer responsive to the error signals over a selected number of range bins to develop an average error signal, said system including multiplier means for multiplying said average error signal by said first difference signal for developing an actual error signal, and
   second subtracting means for responding to said actual error signal and said first difference signal for developing said corrected first difference signal.

4. The combination of claim 3 further including gating means coupled between said normalizing means and said error averaging computer for passing said angle error signal upon detection of clutter.

5. A clutter cancelling system responsive to first and second clutter signals at respective first and second doppler frequencies received over a plurality of range bins comprising
   first canceller means for substantially cancelling said first clutter signal and developing a first difference signal,
   second canceller means responsive to said first difference signal for developing a second difference signal as a function of said second clutter signal,
   error signal generating means responsive to said first and second difference signals for developing a corrected first difference signal, said error signal generating means including normalizing means for dividing the second difference signal by the amplitude of said first difference signal to develop an angular error signal, error averaging means coupled to said normalizing means for developing an average error signal over a selected number of range bins, combining means responsive to said average error signal and said first difference signal for developing said corrected first difference signal, and subtracting means responsive to said second difference signal and said corrected first difference signal for developing a corrected second difference signal.

6. The combination of claim 5 further including gating means coupled between said normalizing means and said error averaging means.

7. The combination of claim 6 in which said gating means includes clutter gate generating means responsive to said second difference signal for detecting the presence of clutter over a selected number of range bins.

* * * * *